(12) United States Patent
Horiuchi et al.

(10) Patent No.: US 6,503,673 B2
(45) Date of Patent: Jan. 7, 2003

(54) PHTHALOCYANINE COMPOSITION, PROCESS FOR PRODUCTION THEREOF, AND ELECTROPHOTOGRAPHIC PHOTORECEPTOR

(75) Inventors: Tamotsu Horiuchi, Tokyo (JP); Hideki Nagamura, Tokyo (JP); Makoto Okaji, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/976,005

(22) Filed: Oct. 15, 2001

(65) Prior Publication Data

US 2002/0081508 A1 Jun. 27, 2002

(30) Foreign Application Priority Data

Oct. 24, 2000 (JP) .......................... 2000-324023

(51) Int. Cl.$^7$ ................................. G03G 5/06
(52) U.S. Cl. ................. 430/59.5; 430/78; 540/141
(58) Field of Search ............... 430/78, 59.5; 540/141; 106/411

(56) References Cited

U.S. PATENT DOCUMENTS 5,626,999 A * 5/1997 Itagaki et al. ............... 430/59.5
6,225,015 B1 * 5/2001 Okaji et al. ................. 430/78

FOREIGN PATENT DOCUMENTS

| JP | 61-217050 | 9/1986 |
|---|---|---|
| JP | 62-67094 | 3/1987 |
| JP | 64-17066 | 1/1989 |
| JP | 1-142658 | 6/1989 |
| JP | 1-142659 | 6/1989 |
| JP | 1-221461 | 9/1989 |
| JP | 2-84661 | 3/1990 |
| JP | 2-170166 | 6/1990 |
| JP | 2-272067 | 11/1990 |
| JP | 3-128973 | 5/1991 |
| JP | 3-225456 | 11/1991 |
| JP | 3-250059 | 11/1991 |
| JP | 3-250060 | 11/1991 |
| JP | 4-193881 | 7/1992 |
| JP | 4-351673 | 12/1992 |
| JP | 8-67829 | 3/1996 |
| JP | 8-110649 | 4/1996 |
| JP | 11-349841 A | 12/1999 |
| JP | 200-239551 | 9/2000 |
| JP | 2000-239557 | 9/2000 |
| JP | 2000-258937 | 9/2000 |
| JP | 2000-267316 | 9/2000 |

* cited by examiner

*Primary Examiner*—John Goodrow
(74) *Attorney, Agent, or Firm*—Nixon & Vanderhye P.C.

(57) ABSTRACT

Disclosed are a phthalocyanine composition suitable for use in an electrophotographic photoreceptor that exhibits a high charge potential and a high sensitivity and which exhibits stable performances without causing a change in various properties in repeated use, a process for the production thereof, and an electrophotographic photoreceptor to which the above phthalocyanine composition is applied.

The present invention provides a phthalocyanine composition comprising a oxytitanium phthalocyanine and a metal-free phthalocyanine and having a crystal form having peaks at Bragg angles (2θ±0.2°) of 7.0°, 9.0°, 14.1°, 18.0°, 23.7° and 27.3°, and having no peak at a Bragg angle (2θ±0.2°) of 9.5°, in CuKα 1.541-angstrom X ray diffraction spectrum, a process for the production of the above phthalocyanine composition, comprising carrying out crystal transformation treatment of an amorphous oxytitanium phthalocyanine and an amorphous metal-free phthalocyanine in a solvent containing water and a naphthalene, and an electrophotographic photoreceptor comprising an electrically conductive substrate and a photosensitive layer formed thereon, the photosensitive layer containing the above phthalocyanine composition as a charge-generating material.

15 Claims, 6 Drawing Sheets

PHTHALOCYANINE COMPOSITION, PROCESS FOR PRODUCTION THEREOF, AND ELECTROPHOTOGRAPHIC PHOTORECEPTOR

BACKGROUND OF THE INVENTION

1. Field of the Invention

The present invention relates to a phthalocyanine composition, a process for the production thereof and an electrophotographic photoreceptor. More specifically, it relates to a phthalocyanine composition suitable for use in an electrophotographic photoreceptor that has a high charge potential and high sensitivity and which is capable of exhibiting stable performances without causing a change in various properties in repeated use, a process for efficiently producing the above phthalocyanine composition and an electrophotographic photoreceptor to which the above phthalocyanine composition is applied and which has the above excellent properties.

2. Related Art Statement

In recent years, electrophotography is not only used in the field of copying machines, but also it now has come into wide use in the fields of a printing plate, a slide film and a microfilm where photography has been conventionally used. Further, studies are being made on the application of electrophotography to a high-speed printer using a laser, an LED or a CRT as a light source. Further, studies have recently also begun concerning the application of photoconductive materials to uses other than the electrophotographic photoreceptor, such as electrostatic recording elements, sensor materials and EL devices. A photoconductive material and an electrophotographic photoreceptor using the same are therefore being demanded to satisfy higher levels in wider fields of applications. For an electrophotographic photoreceptor, inorganic photoconductive materials such as selenium, cadmium sulfide, zinc oxide and silicon have been known, and these have been widely studied and put into practical use. These inorganic materials have various advantages and at the same time have various disadvantages. For example, selenium has defects that production conditions with it are severe and that it is easily crystallized due to heat or mechanical impact. Cadmium sulfide and zinc oxide are poor in humidity resistance and durability. It is pointed out that silicon has poor chargeability and difficulty of production. Further, selenium and cadmium sulfide also involve toxicity problems.

In contrast, organic photoconductive materials have advantages that they are excellent in film-formability and also excellent in flexibility, that they are light in weight and excellent in transparency and that they are feasible for designing a photoreceptor to light in a wide wavelength region according to a proper sensitizing method. For these reasons, practical use thereof is gradually attracting attention.

Meanwhile, a photoreceptor for use in electrophotography is required to satisfy the following general basic properties. That is, (1) it is to have a high chargeability to corona discharge in a dark place, (2) it is to be free of much leakage of an obtained charge in a dark place (dark decay), (3) it is to readily dissipate a charge upon irradiation with light (light decay), and (4) it is to be free of residual charge after irradiation with light.

However, as organic photoconductive materials, photoconductive polymers including polyvinylcarbazole have been so far studied in various ways, while these are not necessarily satisfactory in film formability, flexibility and adhesion and cannot be said to fully have the above basic properties as a photoreceptor.

Organic low-molecular-weight photoconductive compounds can give a photoreceptor excellent in film formability, adhesion and mechanical properties such as flexibility by selecting a binder for forming the photoreceptor, while it is difficult to find out a compound suitable for retaining high-sensitivity properties.

For overcoming the above problems, there have been developed organic photoreceptors having higher sensitivity properties imparted by using different materials which separately have charge generation function and a charge transportation function. These photoreceptors called a function-separation type have a feature in that materials suitable for individual functions can be selected from a broad range of materials, and a photoreceptor having predetermined performances can be easily produced, so that studies have been extensively under way.

Of these materials, various materials such as phthalocyanine pigments, squarilium dyes, azo pigments and perylene pigments have been studied as a material having the function of charge generation. Above all, azo pigments have been studied in various ways and practically have been in wide use since they can have diversified molecular structures and can be expected to show high charge generation efficiency. However, it has not yet been clear what relationships are there between the molecular structure and the charge generation efficiency of the azo pigments. Under the circumstances, a huge volume of studies have been made on syntheses thereof to find out optimum structures, while there have not yet been obtained any azo pigments which satisfy demands of the above basic properties and high durability as a photoreceptor.

In recent years, further, laser beam printers having advantages of a high speed, a high-quality image and non-impact properties by using laser beam in place of conventional white light are widely used together with advanced data processing systems, and it is accordingly desired to develop materials that can comply with requirements therefor. Of laser beams, a semiconductor laser, which has been and is increasingly applied to a compact disc, an optical disc, etc., in recent years and has been remarkably technically developed, is actively applied to the field of printers as a compact and highly reliable light source material. In this case, the wavelength of the light source is approximately 780 to 830 nm, and it is therefore intensely desired to develop a photoreceptor having high-sensitivity properties to light in a near infrared region. Under the circumstances, developments of photoreceptors using phthalocyanines particularly having light absorption in a near infrared region are actively under way.

Not only phthalocyanines differ in absorption spectrum, photoconductivity, etc., depending upon central metals, but also phthalocyanines having an identical central metal differ in the above various properties depending upon crystal forms, and it is reported that phthalocyanines having specific crystal forms are selected for an electrophotographic photoreceptor.

For example, concerning oxytitanium phthalocyanine (to be sometimes abbreviated as "TiOPc" hereinafter), JP-A-61-217050 discloses an α-form TiOPc having main diffraction peaks at Bragg angles (2θ±0.2°) of 7.6°, 10.2°, 22.3°, 25.3° and 28.6° in X-ray diffraction spectrum, and JP-A-62-67094 discloses a β-form TiOPc having main diffraction peaks at Bragg angles of 9.3°, 10.6°, 13.2°, 15.1°, 15.7°, 16.1°, 20.8°, 23.3°, 26.3° and 27.1°. However, these phthalocyanines fail to fully satisfy required high properties.

Even if phthalocyanines are limited to those which have a peak at Bragg angle (2θ±0.20°) of 27.2° in X-ray diffraction spectrum, II type TiOPc reported in JP-A-62-67094 has poor chargeability and low sensitivity. JP-A-64-17066 discloses a Y-form TiOPc that has a main diffraction peaks at 9.5°, 9.7°, 11.7°, 15.0°, 23.5°, 24.1°, 27.3° and exhibits relatively good sensitivity. However, it has a problem that it causes transformation to other crystal form during dispersing and that its dispersion is poor in stability with the passage of time.

Further, there are reports on the use of a mixed crystal or a simple mixture of two or more phthalocyanines as a charge-generating material for an electrophotographic photoreceptor. For example, JP-A-1-142659 discloses an α-form TiOPc composition containing α-TiOPc and metal-free phthalocyanine (to be sometimes referred to as "$H_2Pc$" hereinafter). JP-A-2-170166 discloses a mixed crystal formed of two or more phthalocyanines having different central metals. JP-A-2-272067 discloses an X-form $H_2Pc$ composition containing TiOPc and $H_2Pc$. JP-A-4-351673 discloses a mixed crystal formed of TiOPc and hydroxymetalphthalocyanine. JP-A-8-67829 discloses a mixed crystal material that is formed of TiOPc and $H_2Pc$ and has main diffraction peaks at Bragg angles (2θθ±0.2°) of 6.8°, 7.4°, 15.0°, 24.7°, 26.2° and 27.2° in X-ray diffraction spectrum. However, these are also fail to have required properties.

As described above, various improvements have been added to the production of electrophotographic photoreceptors. Under the circumstances, however, there have not yet been obtained any electrophotographic photoreceptors that fully satisfy the above demands to basic properties, high durability, and the like required of an electrophotographic photoreceptor.

DISCLOSURE OF THE INVENTION

Under the circumstances, it is a first object of the present invention to provide a phthalocyanine composition suitable for an electrophotographic photoreceptor that exhibits a high chargeability and high sensitivity and which can exhibit stable performances without causing various properties to change even when used repeatedly.

It is a second object of the present invention to provide a process for efficiently producing the above phthalocyanine composition.

It is a third object of the present invention to provide an electrophotographic photoreceptor to which the above phthalocyanine composition is applied and which has the above excellent properties.

For achieving the above objects, the present inventors have made diligent studies and found that the above first object can be achieved by a phthalocyanine composition comprising a oxytitanium phthalocyanine and a metal-free phthalocyanine and having specific Bragg angles in X-ray diffraction spectrum, that the above second object can be achieved by a process for producing the above phthalocyanine composition by crystal transformation treatment of an amorphous oxytitanium phthalocyanine and an amorphous metal-free phthalocyanine in a specific solvent, and that the above third object can be achieved by an electrophotographic photoreceptor having the above excellent properties, obtained by forming a photosensitive layer containing the above phthalocyanine composition on a conductive substrate. The present invention has been completed on the basis of the above finding.

That is, according to the present invention, (1) there is provided a phthalocyanine composition comprising at least a oxytitanium phthalocyanine and a metal-free phthalocyanine and having a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum.

According to the present invention, (2) there is also provided a process for the production of a phthalocyanine composition, which comprises carrying out crystal transformation treatment of an amorphous oxytitanium phthalocyanine and an amorphous metal-free phthalocyanine in a solvent containing water and a naphthalene, to convert,them into a composition containing a oxytitanium phthalocyanine and a metal-free phthalocyanine and having a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum.

According to the present invention, (3) there is further provided an electrophotographic photoreceptor comprising an electrically conductive substrate and a photosensitive layer formed thereon, the photosensitive layer containing the above phthalocyanine composition described in the above (1), as a charge-generating material.

PREFERRED EMBODIMENTS OF THE INVENTION

Figure 1:
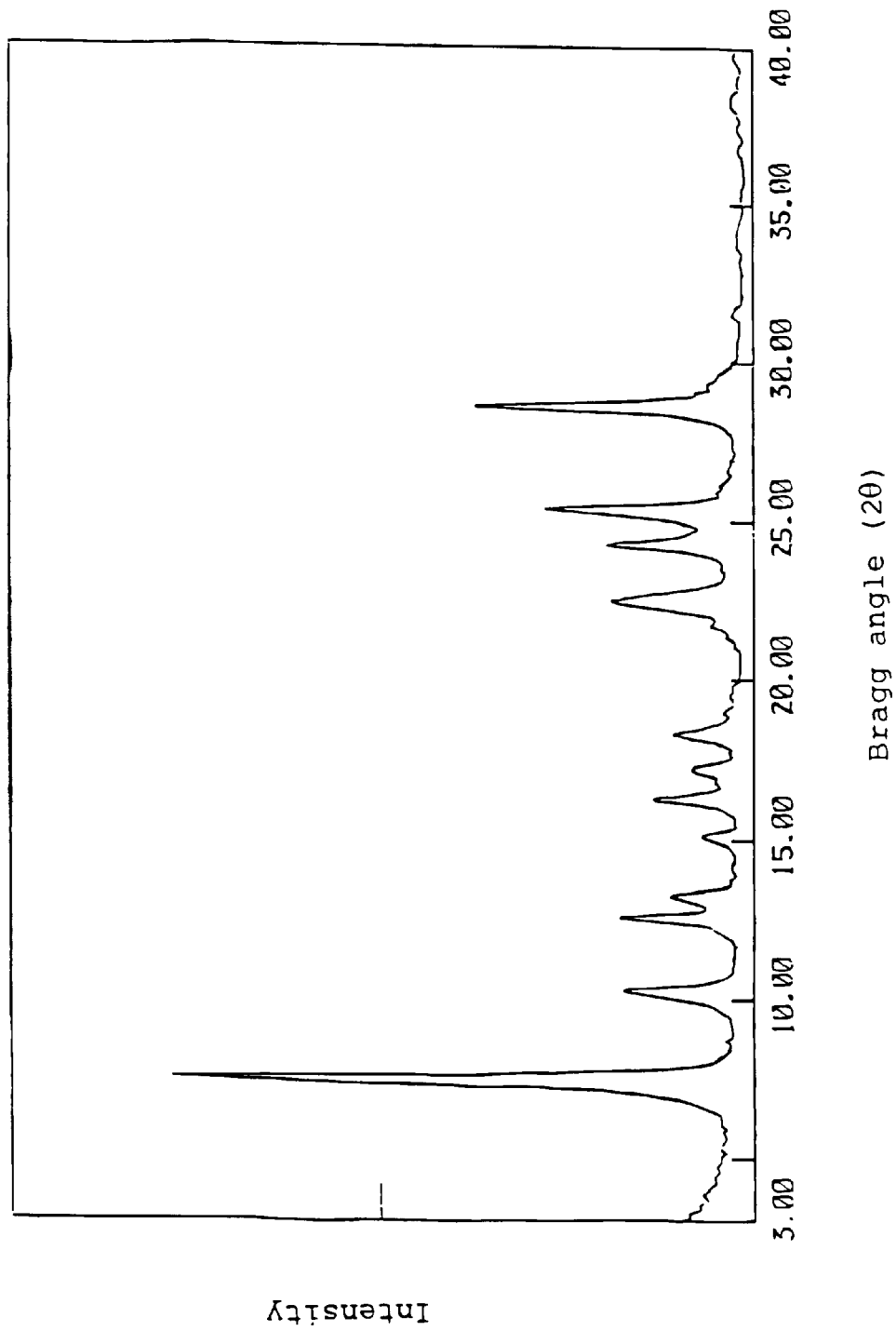
FIG. 1 is an X-ray diffraction spectrum of TiOPc obtained in Example 1(1).

The phthalocyanine composition of the present invention contains at least a oxytitanium phthalocyanine and a metal-free phthalocyanine, and these phthalocyanines can be obtained by a known production method. The production method is described, for example, in "Phthalocyanine Compounds" written by F. H. Moser and A. L. Thomas (1963), and the phthalocyanines can be easily obtained according to the method described therein. Further, the method for preparing, for example, oxytitanium phthalocyanine (TiOPc) includes a method of condensating phthalodinitrile and titanium tetrachloride and a method of reacting 1,3-diiminoisoindoline with titanium tetraalkoxide, disclosed in PB85172. FIAT. FINAL REPORT 1313, Feb. 1, 1948, JP-A-1-142658 and JP-A-1-221461. These reactions are preferably carried out in an organic solvent, and the organic solvent preferably includes inert and high-boiling-point solvents such as 1-chloronaphthalene, 2-chloronaphthalene, 1-methylnaphthalene, 1-methoxynaphthalene, diphenylnaphthalene, ethylene glycol dialkyl ether, quinoline, sulfolane, dichlorobenzene, N-methyl-2-pyrrolidone and dichlorotoluene.

The phthalocyanines obtained by the above methods are purified using an acid, an alkali, acetone, methanol, ethanol, methyl ethyl ketone, tetrahydrofuran, pyridine, quinoline, sulfolane, 1-chloronaphthalene, toluene, xylene, dioxane, chloroform, dichloroethane, N,N-dimethylformamide, N-methyl-2-pyrrolidone or water, whereby high-purity phthalocyanines for use in the electrophotographic field can be obtained. The purification method includes a washing method, a recrystallization method, an extraction method using a Soxhlet extractor, a heat suspension method and a sublimation method. The purification method shall not be limited to these, and any purification method can be employed so long as unreacted materials and byproducts can be removed.

The phthalocyanine composition of the present invention contains at least oxytitanium phthalocyanine (TiOPc) and a metal-free phthalocyanine ($H_2Pc$), and it may further contain phthalocyanines other than TiOPc and $H_2Pc$. The phthalocyaniens that can be optionally contained may be any known phthalocyanines and derivatives thereof. The derivatives includes a phthalocyanine whose isoindole ring has a substituent and a phthalocyanine having a ligand as a central metal. Specific examples of the phthalocyanines that can be optionally contained include vanadyl phthalocyanines, copper phthalocyanines, aluminum phthalocyanines, gallium phthalocyanines, indium phthalocyanines, germanium phthalocyanines, lithium phthalocyanines, sodium phthalocyanines, potassium phthalocyanines, zirconium phthalocyanines, hafnium phthalocyanines, magnesium phthalocyanines, tin phthalocyanines, zinc phthalocyanines, cobalt phthalocyanines, nickel phthalocyanines, barium phthalocyanines, beryllium phthalocyanines, cadmium phthalocyanines, iron phthalocyanines, silicon phthalocyanines, lead phthalocyanines, silver phthalocyanines, gold phthalocyanines, platinum phthalocyanines, ruthenium phthalocyanines, palladium phthalocyanines, metal-free phthalocyanines and titanyl-naphthalocyanines. Of these, oxyvanadium phthalocyanine, chloroaluminum phthalocyanine, chlorogallium phthalocyanine, chloroindium phthalocyanine, dichlorogermanium phthalocyanine, hydroxyaluminum phthalocyanine, hydroxygallium phthalocyanine, hydroxyindium phthalocyanine and dihydroxygermanium phthalocyanine are particularly preferred.

Concerning the amount ratio of TiOPc and phthalocyanines other than TiOPc in the phthalocyanine composition of the present invention, the amount of the phthalocyanines other than TiOPc per 100 parts by weight of TiPOc is preferably 0.1 to 50 parts by weight, more preferably 1 to 40 parts by weight. The phthalocyanines other than TiOPc may be $H_2Pc$ alone, or they may be a mixture of $H_2Pc$ and the above optionally selected phthalocyanines. Concerning the mixing ratio of $H_2Pc$ and the above optionally selected phthalocyanines, the amount of the above optionally selected phthalocyanines per 100 parts by weight of $H_2Pc$ is preferably 100 parts by weight or less, more preferably 50 parts by weight or less.

The phthalocyanine composition of the present invention contains at least oxytitanium phthalocyanine and a metal-free phthalocyanine and has a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα1.541-angstrom X ray diffraction spectrum. When used as a charge-generating material in an electrophotographic photoreceptor, the phthalocyanine composition can give an electrophotographic photoreceptor that has a high charge potential and high sensitivity and which can exhibit stable performances without causing a change in various properties when used repeatedly.

The phthalocyanine composition of the present invention having the above properties can be efficiently produced by the following process of the present invention.

In the process of the present invention, amorphous oxytitanium phthalocyanine and amorphous metal-free phthalocyanine are crystal transformation-treated in a solvent containing water and a naphthalene, to convert them into an end composition containing a oxytitanium phthalocyanine and a metal-free phthalocyanine and having a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum.

The amorphous phthalocyanines for use in the present invention, i.e., amorphous TiOPc and amorphous $H_2Pc$, are preferably amorphous phthalocyanines obtained by rendering phthalocyanines amorphous by an acid pasting method. The acid pasting method refers to a method in which phthalocyanines are dissolved in a strong acid such as concentrated sulfuric acid and the resultant solution is poured into a poor solvent such as water to form particles. The acid pasting method used in the present invention refers to a method in which TiOPc is dissolved in a strong acid such as concentrated sulfuric acid or formed into a slurry thereof in such a solvent, the resultant solution or slurry is diluted with water, or the like, to precipitate a crystal, and the obtained crystal is consecutively washed with water, methanol, and the like. TiOPc that is to be rendered amorphous may have any crystal form.

Although not specially limited, the naphthalene for use in the process for the production of the phthalocyanine composition in the present invention includes naphthalene, 1-methylnaphthalene, 2-methylnaphthalene, 1-chloronaphthalene, 1-methoxynaphthalene, 2-phenoxynaphthalene, 2-benzyloxynaphthalene and a mixture of any two compounds of these.

In the process for the production of a phthalocyanine composition in the present invention, the above naphthalene and water are used in combination. While the amount ratio of the amorphous phthalocyanines and water are not specially limited so long as the phthalocyanines can be dispersed, generally, the amount of the water based on 1 part by weight of the amorphous phthalocyanines is preferably in the range of from 2 to 100 parts by weight. Similarly, concerning the amount ratio of the amorphous phthalocyanines and the naphthalene, the amount of the naphthalene per 100 parts by weight of the phthalocyanines is preferably 10 to 5,000 parts by weight, more preferably 50 to 500 parts by weight.

Further, the naphthalene can be used in combination with various organic solvents. Specifically, the organic solvents that can be used in combination include alcohol solvents such as methanol, ethanol and isopropyl alcohol, ketone solvents such as acetone, methyl ethyl ketone and methyl isobutyl ketone, ester solvents such as ethyl formate, ethyl acetate and n-butyl acetate, ether solvents such as diethyl ether, dimethoxyethane, tetrahydrofuran, dioxolane, dioxane and anisole, amide solvents such as N,N-dimethylformamide, N,N-dimethylacetamide and N-methyl-2-pyrrolidone, hydrocarbon halide solvents such as dichloromethane, chloroform, bromoform, methyl iodide, dichloroethane, trichloroethane, trichloroethylene, chlorobenzene, o-dichlorobenzene, fluorobenzene, bromobenzene, iodobenzene and α-chloronaphthalene, and hydrocarbon solvents such as n-pentane, n-hexane, n-octane, 1,5-hexadiene, cyclohexane, methylcyclohexane, cyclohexadiene, benzene, toluene, o-xylene, m-xylene, p-xylene, ethylbenzene, cumene and terpinolene. Of these, ketone solvents and hydrocarbon solvents are preferred. These solvents may be used alone or in combination.

Concerning the amount ratio of the naphthalene and the above organic solvent(s) when the organic solvent(s) is used for the crystal transformation, the amount of the organic solvent(s) per 100 parts by weight of the naphthalene is preferably 1,000 parts by weight or less, more preferably 200 parts by weight or less.

In the process for the production of a phthalocyanine composition in the present invention, the temperature for the crystal transformation treatment is preferably in the range of from 80° C. to 100° C., and more preferably, the crystal transformation treatment is carried out with stirring. The method of stirring includes a method using a stirrer, a ball mill, a paint conditioner, a sand mill, an attritor or a disperser and an ultrasonically dispersing method. Any stirring method may be used so long as dispersing can be carried out, and the dispersing method shall not be limited thereto. The time period required for the transformation is preferably 5 seconds to 120 hours, more preferably 10 seconds to 50 hours, still more preferably 1 minute to 50 hours.

The above crystal transformation treatment may be carried out in the presence of a surfactant. The surfactant can be selected from cationic, nonionic and anionic surfactants, and the amount of the surfactant per 100 parts by weight of the amorphous phthalocyanines is preferably 0.001 to 50 parts by weight, more preferably 0.5 to 5 parts by weight.

According to the above process, there can be efficiently obtained the phthalocyanine composition of the present invention, which contains at least oxytitanium phthalocyanine and a metal-free phthalocyanine and has a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum.

The electrophotographic photoreceptor of the present invention comprises an electrically conductive substrate and a photosensitive layer formed thereon, the photosensitive layer comprising the above phthalocyanine composition of the present invention.

The form of the electrophotographic photoreceptor of the present invention is not critical. For example, there is an electrophotographic photoreceptor having an electrically conductive substrate and a single-layered photosensitive layer that is formed on the electrically conductive substrate and contains a charge-generating material, a charge-transporting material and a film-forming binder resin. Further, there is known an electrophotographic photoreceptor having an electrically conductive substrate and a multi-layered photosensitive layer that is formed on the electrically conductive substrate and is formed of a charge-generating layer containing a charge-generating material and a film-forming binder resin and a charge-transporting layer containing a charge-transporting material and a film-forming binder resin. In this case, it is not any problem which constitutes an upper layer, the charge-generating layer or the charge-transporting layer. Further, an undercoat layer may be formed between the electrically conductive substrate and the photosensitive layer, and an overcoat layer may be formed on the photoreceptor, as required. In the multilayered photosensitive layer, an intermediate layer may be formed between the charge-generating layer and the charge-transporting layer as required.

In the electrophotographic photoreceptor of the present invention, the electrically conductive substrate includes, for example, a drum made of a metal, a metal sheet and a sheet-shaped, drum-shaped or belt-shaped substrate made of paper or a plastic film that is rendered electrically conductive.

As the charge-generating material in the electrophotographic photoreceptor of the present invention, there is used the phthalocyanine composition of the present invention, that is, a phthalocyanine composition containing at least oxytitanium phthalocyanine and a metal-free phthalocyanine and having a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum. The above phthalocyanine composition may be used in combination with other charge-generating material. The "other" charge-generating material that can be used in combination includes a triphenylmethane dye, a xanthene dye, an acridine dye, a thiazine dye, a pyrylium dye, an azulenium dye, a thiilium dye, a cyanine dye, a squarilium dye, a pyrrolopyrrole dye, a polycyclic quinone dye, a perylene dye, a perinone dye, an anthraquinone dye, a dioxadine dye, an azo dye and other phthalocyanines. These charge-generating materials may be used alone or in the form of a mixture.

Further, the charge-transporting material for use in the electrophotographic photoreceptor of the present invention includes a hole-transporting material and an electron-transporting material. Examples of the former hole-transporting material include known oxadiazoles, triphenylmethanes, pyrazolines, hydrazones, tetraarylbenzidines and stilbenes. Of these, hydrazones and stilbenes are particularly preferred. These materials may be used alone or in combination.

Examples of the latter electron-transporting material include chloranil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 1,3,7-trinitrodibenzothiophene and 1,3,7-trinitrodibenzothiophene-5,5-dioxide. These electron-transporting materials may be used alone or in combination.

As a sensitizer for intensifying the sensitivity-increasing effect, further, the photosensitive layer may contain an electron-accepting compound. Examples of the electron-accepting compound include quinones such as 2,3-dichloro-1,4-naphthoquinone, 1-nitroanthraquinone, 1-chloro-5-nitroanthraquinone, 2-chloroanthraquinone and phenanthrenequinone, aldehydes such as 4-nitrobenzaldehyde, ketones such as 9-benzoylanthracene, indandione, 3,5-dinitrobenzophenone and 3,3',5,5'-tetranitrobenzophenone, acid anhydrides such as phthalic anhydride and 4-chloronaphthalic anhydride, cyano compounds such as terephthalalmalononitrile, 9-anthrylmethylidenemalononitrile, 4-nitrobenzalmalononitrile and 4-(p-nitrobenzoyloxy) banzalmalononitrile, and phthalides such as 3-banzalphthalide, 3-(α-cyano-p-nitrobenzal)phthalide and 3-(α-cyano-p-nitrobenzal)-4,5,6,7-tetrachlorophthalide.

In the electrophotographic photoreceptor of the present invention, the film-forming binder resin used for forming the photosensitive layer includes various binder resins depending upon the fields of use of the photoreceptor. Examples of the film-forming binder resin for use in the field of a photoreceptor of a copying machine include a polystyrene resin, a polyvinyl acetal resin, a polysulfone resin, a polycarbonate resin, a vinyl acetate-crotonic acid copolymer resin, a polyester resin, a polyphenylene oxide resin, a polyarylate resin, an alkyd resin, an acrylic resin, a methacrylic resin, a phenoxy resin and a polyvinyl chloride resin. Of these resins, a polystyrene resin, a polyvinyl acetal resin, a polycarbonate resin, a polyester resin and a polyarylate resin are excellent for potential characteristics of the photoreceptor. The above resins may be homopolymers or copolymers, and they may be used alone or in combination.

In the single-layered photosensitive layer, the amount of the above binder (binder resin) per 100 parts by weight of the total of the phthalocyanine composition of the present invention and the charge-transporting material is preferably 10 to 500 parts by weight, more preferably 50 to 250 parts by weight. In the multilayered photosensitive layer, the amount of the above binder (binder resin) per 100 parts by weight of the phthalocyanine composition of the present invention in the charge-generating layer is preferably 10 to 500 parts by weight, more preferably 50 to 250 parts by weight, and the amount of the above binder (binder resin) per 100 parts by weight of the charge-transporting material in the charge-transporting layer is preferably 10 to 500 parts by weight, more preferably 50 to 250 parts by weight. When the amount ratio of the binder is too large, the charge generation efficiency or the charge transportation efficiency decreases. When it is too small, the film formability comes to be poor, and the photoreceptor may be degraded in properties in repeated use or the coating may have holes.

Some of the above binders are poor in mechanical strength such as tensile strength, flexural strength or compressive strength. For improving these properties, the binder may contain a substance for imparting the binder with plasticity. Specific examples of the substance for imparting plasticity include phthalic esters (e.g., DOP and DBP), phosphoric esters (e.g., TCP and TOP), cebacic ester, adipic ester, nitrile rubber and chlorinated hydrocarbon. Since these substances may have an adverse effect on electrophotographic properties when added in an amount more than necessary, the amount of the above substance per 100 parts by weight of the binder is preferably 20 parts by weight or less.

In addition, as required, the photosensitive layer may contain an antioxidant and a curling preventer as additives and a leveling agent for improving coatability.

The electrophotographic photoreceptor of the present invention can be produced by dissolving or dispersing in a solvent the above various materials for forming a photosensitive layer, applying the resultant coating solution onto the above-explained electrically conductive substrate and drying an applied coating to form the photosensitive layer. The solvent suitable for preparing the coating solution includes water, alcohol solvents such as methanol, ethanol and isopropyl alcohol, ketone solvents such as acetone, methyl ethyl ketone and methyl isobutyl ketone, ester solvents such as ethyl formate, ethyl acetate and n-butyl acetate, ether solvents such as diethyl ether, dimethoxyethane, tetrahydrofuran, dioxolane, dioxane and anisole, amide solvents such as N,N-dimethylformamide, N,N-dimethylacetamide and N-methyl-2-pyrrolidone, halogenated hydrocarbon solvents such as dichloromethane, chloroform, bromoform, methyl iodide, dichloroethane, trichloroethane, trichloroethylene, chlorobenzene, o-dichlorobenzene, fluorobenzene, bromobenzene, iodobenzene and 1-chloronaphthalene, and hydrocarbon solvents such as n-pentane, n-hexane, n-octane, 1,5-hexadiene, cyclohexane, methylcyclohexane, cyclohexadiene, benzene, toluene, o-xylene, m-xylene, p-xylene, ethylbenzene and cumene. Of these, ketone solvents, ester solvents, ether solvents or halogenated hydrocarbon solvents are preferred. These solvents are used alone or in combination.

According to the present invention, there can be provided a phthalocyanine composition suitable for use in an electrophotographic photoreceptor that has a high charge potential and high sensitivity and which can exhibit stable performances without causing any change in properties in repeated use. Further, the present invention can also provide an electrophotographic photoreceptor having the above excellent properties by forming a photosensitive layer containing the above phthalocyanine composition on an electrically conductive substrate.

The present invention will be explained more in detail with reference to Examples hereinafter, while the present invention shall not be limited by these Examples.

EXAMPLE 1

(1) 20.0 Gram of phthalodinitrile was dissolved in 200 ml of 1-chloronaphthalene, and under a nitrogen atmosphere, 9.0 g of titanium tetrachloride was dropwise added. After the addition, the mixture was stirred under heat at 240° C. After 3 hours, the reaction was terminated, a precipitated crystal was recovered by filtration, and the crystal was fully washed with 1-chloronaphthalene and with methanol, to give dichlorotitanylphthalocyanine. The dichlorotitanium phthalocyanine was refluxed together with 150 ml of concentrated aqueous ammonia under heat with stirring. After 1 hour, the reaction was terminated, and a crystal was recovered by filtration, to give 17.4 g of TiOPc. The recovered crystal was measured for a CuKα X ray diffraction spectrum with an X-ray diffractometer (RAD-C system manufactured by Rigaku Denki K.K.) to determine its crystal form. FIG. 1 shows the measurement result.

| | |
|---|---|
| X-ray tube: | Cu |
| Voltage: | 40.0 KV |
| Current: | 100.0 mA |
| Start angle: | 3.0 deg. |
| Stop angle: | 40.0 deg. |
| Step angle: | 0.02 deg. |

Figure 2:
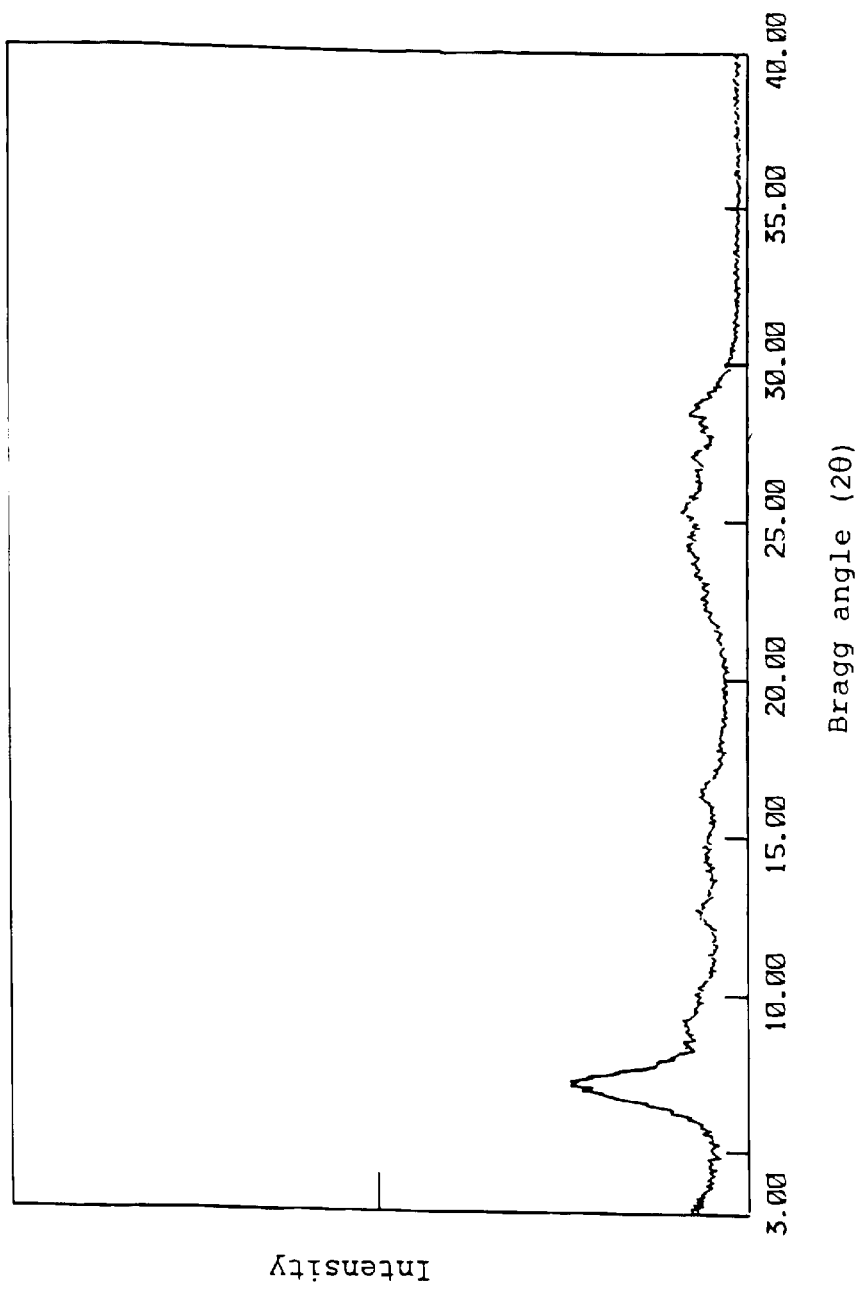
FIG. 2 is an X-ray diffraction spectrum of TiOPc obtained in Example 1(2).

(2) 10.0 Grams of TiOPc obtained in the above (1) was gradually added to, and dissolved in, 100 ml of concentrated sulfuric acid cooled to approximately 2° C. The resultant solution was gradually poured into 1,000 ml of cooled ice water, to precipitate a crystal. The crystal was recovered by filtration, and washed with 1,000 ml of water twice and with 1,000 ml of methanol once to give 9.3 g of the crystal. FIG. 2 shows the X-ray diffraction spectrum of the crystal.

Figure 3:
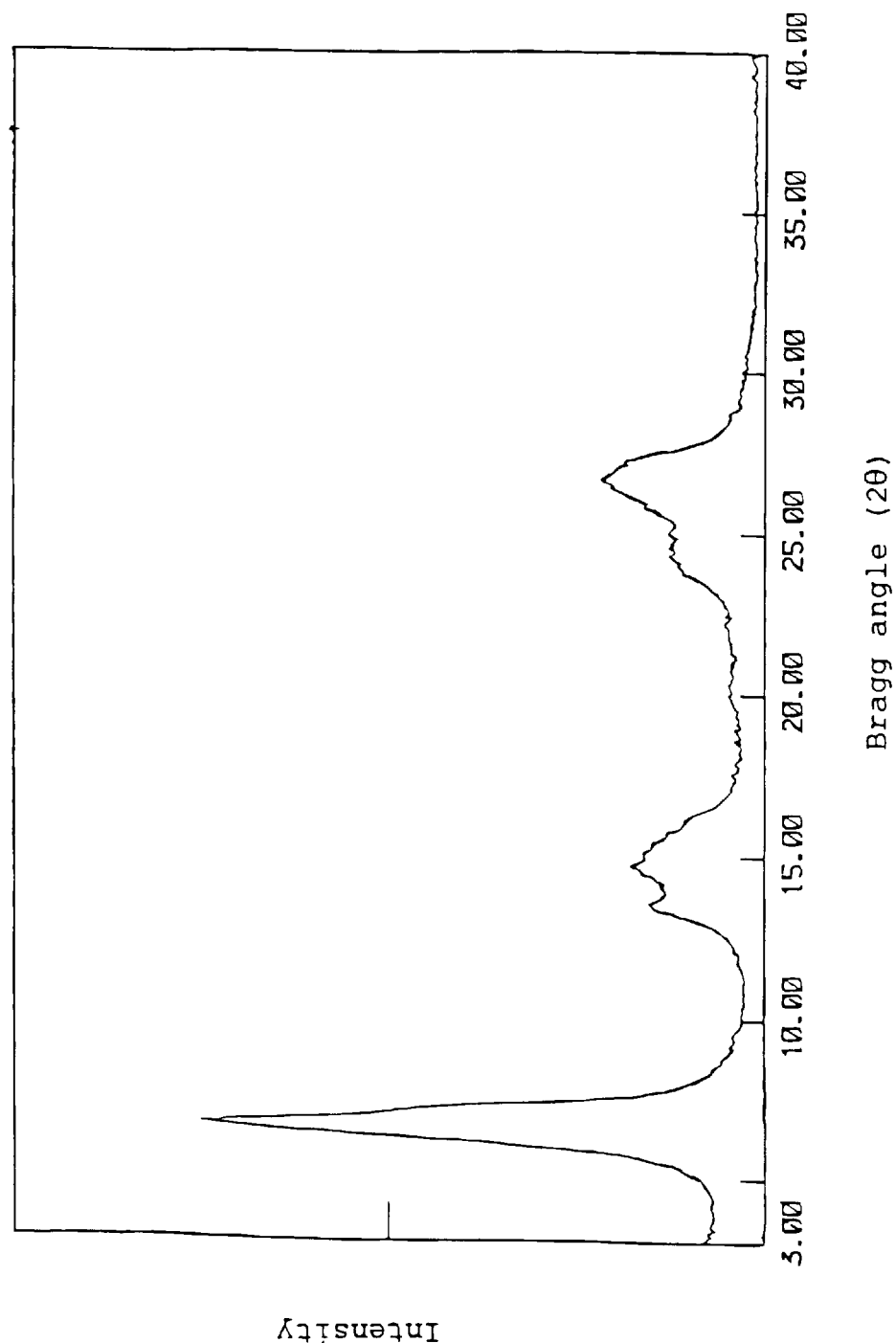
FIG. 3 is an X-ray diffraction spectrum of $H_2Pc$ obtained in Example 1(3).

(3) 10.0 Grams of $H_2Pc$ (MCP-80, manufactured by Dainichiseika Color & Chemicals Mfg. Co., Ltd.) was gradually added to, and dissolved in, 100 ml of concentrated sulfuric acid cooled to approximately 2° C. The resultant solution was gradually poured into 1,000 ml of cooled ice water, to precipitate a crystal. The crystal was recovered by filtration and washed with water until it showed neutrality, to give 9.4 g of the crystal. FIG. 3 shows the X-ray diffraction spectrum of the crystal.

Figure 4:
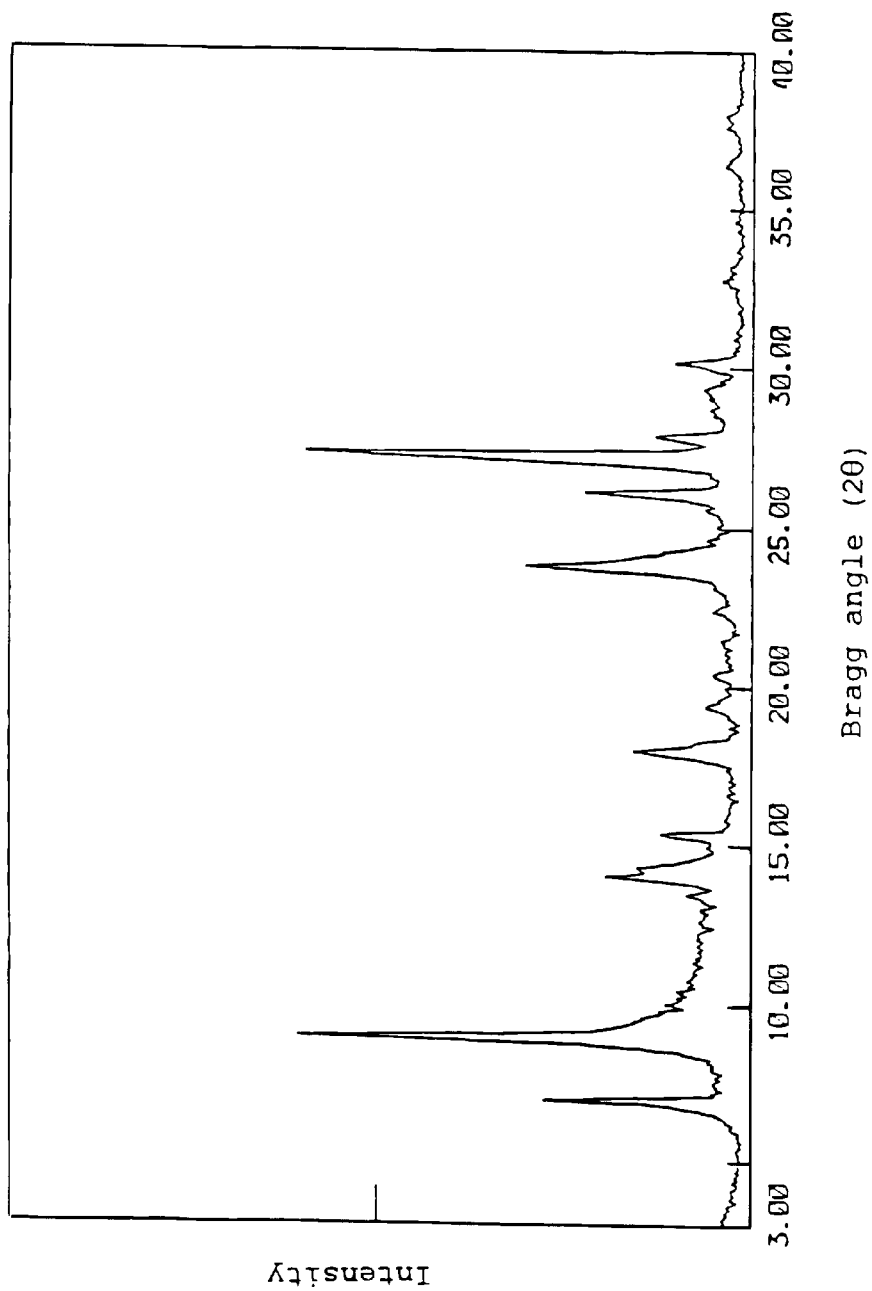
FIG. 4 is an X-ray diffraction spectrum of a phthalocyanine composition obtained in Example 1(4).

(4) 0.7 Gram of TiOPc obtained in the above (2), 0.3 g of $H_2Pc$ obtained in the above (3) and 28.0 g of water were placed in a 100-ml flask and stirred under heat at 85° C. After 10 minutes, 2.0 g of naphthalene was added, and the mixture was further stirred under heat at the above temperature. After 1 hour, the reaction was terminated, and the reaction mixture was allowed to cool to room temperature. A crystal was recovered by filtration and washed with methanol, and as a result, 0.9 g of the crystal was obtained. FIG. 4 shows the X-ray diffraction spectrum of the obtained crystal. FIG. 4 shows that the crystal form of the phthalocyanine composition of the present invention has peaks at Bragg angles (2θ±0.2°) of 7.0°, 9.0°, 14.1°, 18.0°, 23.7° and 27.3° and has no peak at a Bragg angle (2θ±0.2°) of 9.5°.

EXAMPLE 2

Crystal transformation was carried out in the same manner as in Example 1(4) except that 2.0 g of naphthalene was replaced with a mixture of 1.0 g of naphthalene with 1.0 g of ethylcyclohexane. As a result, 0.9 g of a crystal was obtained. The obtained crystal had the same X-ray diffraction spectrum as that shown in FIG. 4.

EXAMPLE 3

Crystal transformation was carried out in the same manner as in Example 1(4) except that 2.0 g of naphthalene was replaced with 2.0 g of 1-methylnaphthalene. As a result, 0.9 g of a crystal was obtained. The obtained crystal had the same X-ray diffraction spectrum as that shown in FIG. 4.

EXAMPLE 4

Crystal transformation was carried out in the same manner as in Example 1(4) except that 2.0 g of naphthalene was replaced with 1.0 g of 2-metyhoxynaphthalene and 1.0 g of toluene. As a result, 0.9 g of a crystal was obtained. The obtained crystal had the same X-ray diffraction spectrum as that shown in FIG. 4.

COMPARATIVE EXAMPLE 1

Figure 5:
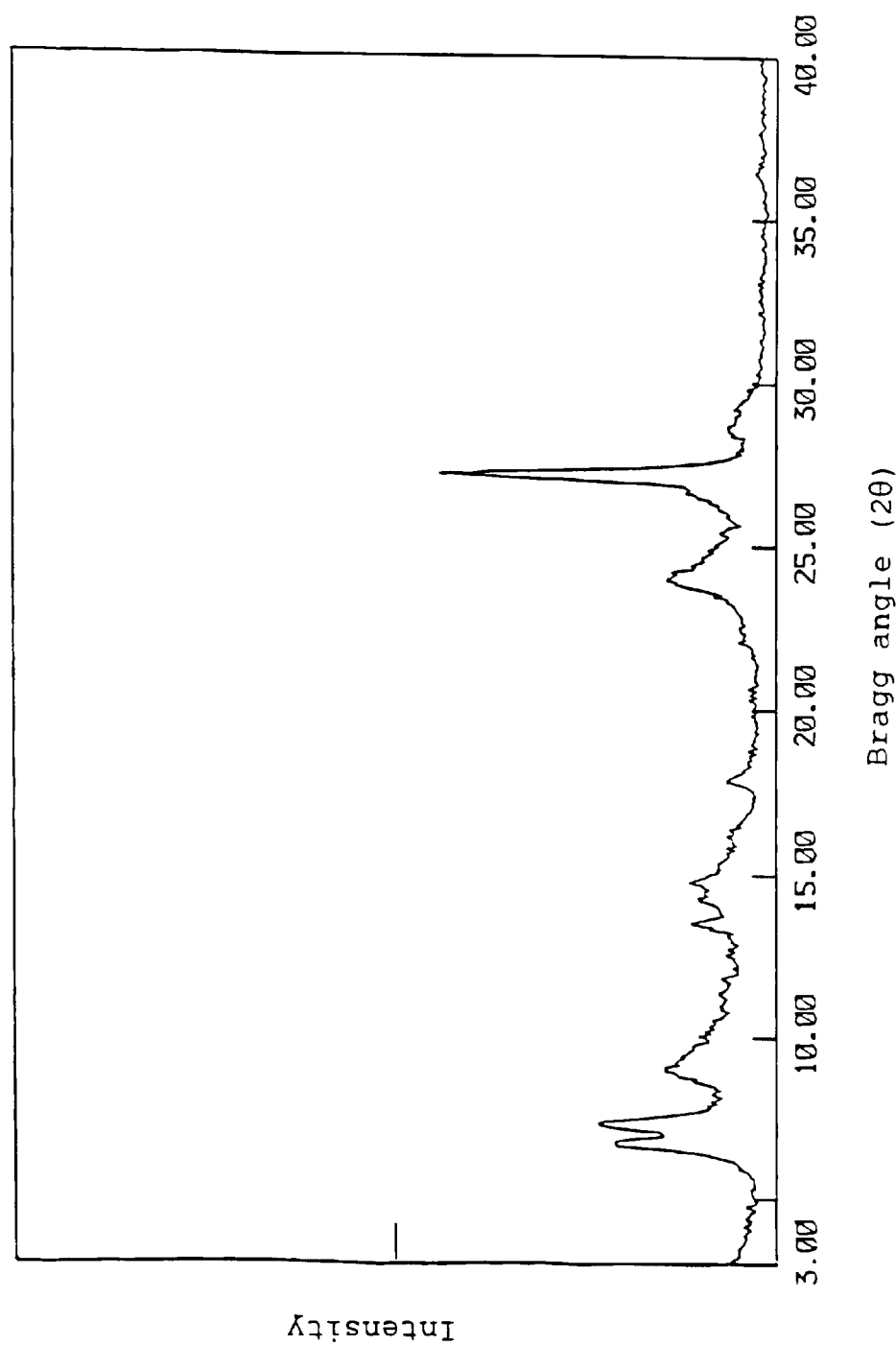
FIG. 5 is an X-ray diffraction spectrum of a phthalocyanine composition obtained in Comparative Example

Crystal transformation was carried out in the same manner as in Example 1(4) except that 2.0 g of naphthalene was replaced with 2.0 g of n-octane. As a result, 0.9 g of a crystal was obtained. FIG. 5 shows an X-ray diffraction spectrum of the crystal. FIG. 5 shows that the crystal form has peaks at Bragg angles (2θ±0.2°) of 6.7°, 7.4° and 27.2° and has no peaks at Bragg angles (2θ±0.2°) of 7.0° and 23.7° and the crystal form differs from the crystal form of the phthalocyanine composition of the present invention.

COMPARATIVE EXAMPLE 2

Figure 6:
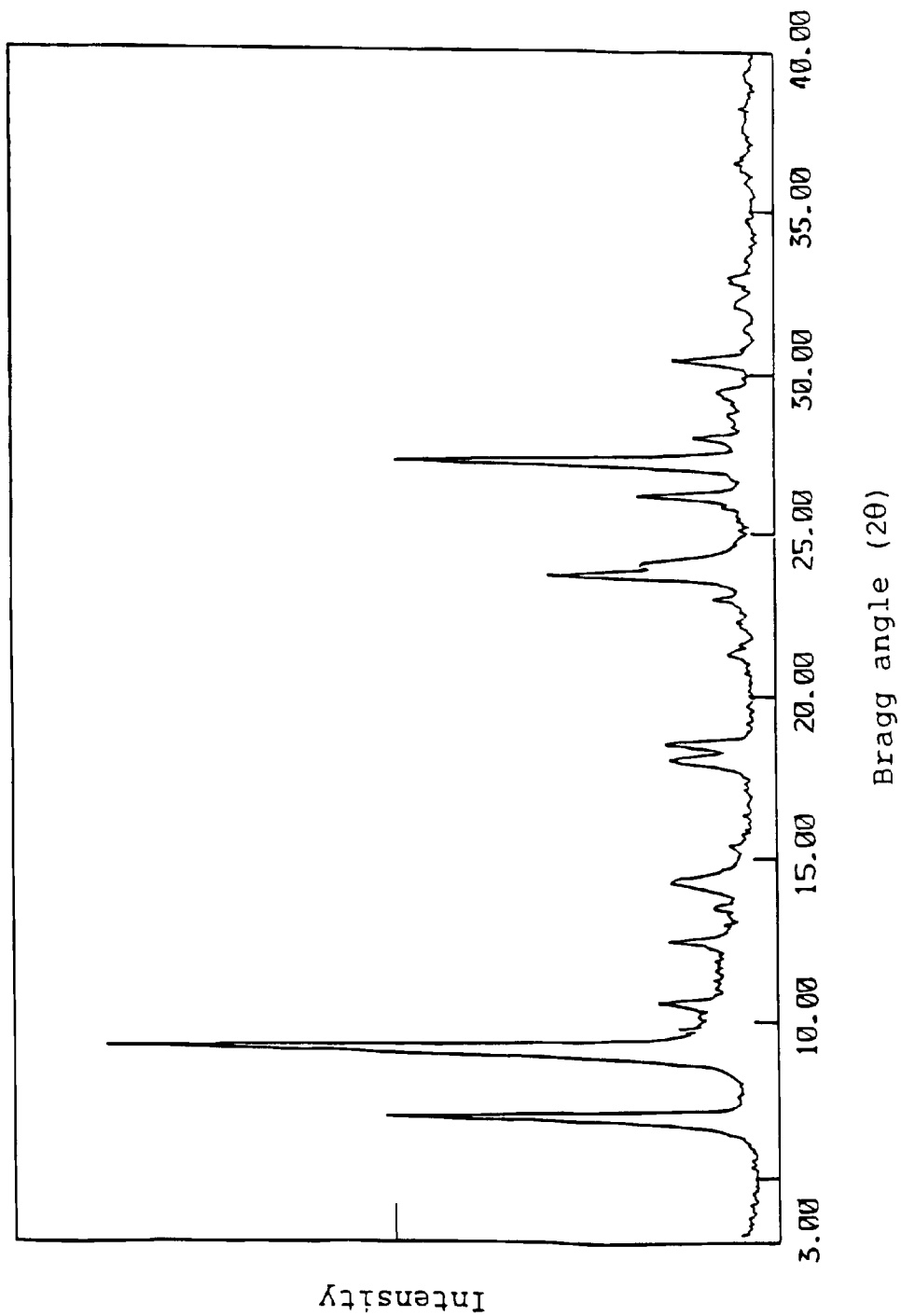
FIG. 6 is an X-ray diffraction spectrum of a phthalocyanine composition obtained in Comparative Example 2.

Crystal transformation was carried out in the same manner as in Example 1(4) except that 0.3 g of $H_2Pc$ obtained in Example 1(3) was replaced with 0.3 g of α-form copper phthalocyanine (P-1005, manufactured by Tokyo Chemical Industry Co., Ltd.). As a result, 0.9 g of a crystal was obtained. FIG. 6 shows an X-ray diffraction spectrum of the crystal. FIG. 6 shows that the crystal form has peaks at Bragg angles (2θ±0.2°) of 7.0°, 9.2°, 10.5°, 12.5°, 14.3°, 18.1°, 18.6°, 23.7°, 26.2°, 27.3° and 30.4°. Since the phthalocyanine composition of the present invention has no peaks at 9.2°, 10.5°, 12.5° and 18.6°, it is seen that the crystal differs from the composition of the present invention.

EXAMPLE 5

1Part by weight of the phthalocyanine composition obtained in Example 1, 1 part by weight of a polyester resin (Vylon 220, manufactured by Toyobo Co., Ltd.) and 100 parts by weight of methyl ethyl ketone were dispersed together with glass beads for 1 hour. The resultant dispersion was applied onto an aluminum-deposited polyester with an automatic film applicator (No. 542AB, Yasuda Seiki Seisakusho Ltd.), and the applied dispersion was dried to form a charge-generating layer having a thickness of approximately 0.2 μm. Then, the following Compound (1) was mixed with a polyarylate resin (U-Polymer, manufactured by Unitika, Ltd.) in a mixing ratio of 1:1, and a solution of 10% by weight of the mixture in dichloroethane as a solvent was prepared. The solution was applied onto the above charge-generating layer to form a charge-transporting layer having a thickness of 20 μm. Compound (1)

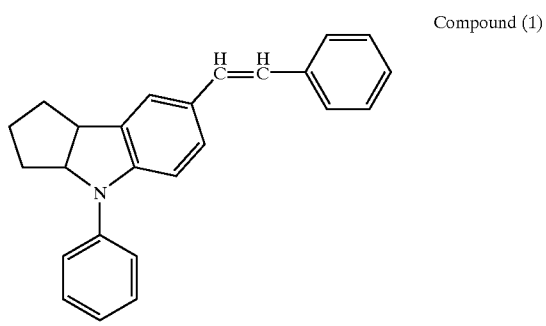

The thus-prepared double layered electrophotographic photoreceptor was evaluated for electrophotographic properties with an electrostatic paper analyzer (EPA-8200, manufactured by Kawaguchi Electric Mfg. Co., Ltd.).

Measurement conditions: Applied voltage −4.7 kV, Static No. 3 (Turning speed mode of turn table: 10 m/min.)

As a result, the photoreceptor showed a high sensitivity, or a charge potential (V0) of −745 V and a half-decay exposure (E1/2) of 0.60 lux·second.

Further, the photoreceptor was evaluated for properties in repeated use in which charging and charging-erasing as one cycle were repeated (erase lamp: irradiation with white light at 400 luxes for 1 second) with the above analyzer. When a change in charge potential in 1,000-cycle repeated use was determined, the charge potential (V0) in a first cycle was −745 V, and the charge potential (V0) in a 1,000th cycle was −725 V. That is, the photoreceptor showed almost no decrease in potential in the repeated use and exhibited stable properties. Further, the half-decay exposure (E1/2) in the first cycle was 0.60 lux·second, and the half-decay exposure (E1/2) in the 1,000th cycle was 0.60 lux·second or did not change. That is, the photoreceptor exhibited excellent properties.

EXAMPLES 6–8 AND COMPARATIVE EXAMPLES 3 AND 4

Electrophotographic photoreceptors were prepared in the same manner as in Example 5 except that the phthalocyanine composition obtained in Example 1 was replaced with the phthalocyanine compositions obtained in Examples shown in Table 1 or the phthalocyanine compositions obtained in Comparative Examples shown in Table 1. Table 1 shows electrophotographic properties of the electrophotographic photoreceptors.

TABLE 1

| Ex. or CEx. | Phthalocyanine composition | 1st cycle V0 (V) | 1st cycle E1/2* | 1,000th cycle V0 (V) | 1,000th cycle E/1/2 |
|---|---|---|---|---|---|
| Ex. 6 | Example 2 | −735 | 0.60 | −715 | 0.60 |
| Ex. 7 | Example 3 | −720 | 0.59 | −700 | 0.59 |
| Ex. 8 | Example 4 | −725 | 0.61 | −705 | 0.61 |
| CEX. 3 | CEx. 1 | −575 | 1.83 | −350 | 3.20 |
| CEx. 4 | CEx. 2 | −240 | 1.20 | −30 | 2.22 |

*lux · second
Ex. = Example,
CEx. = Comparative Example

The phthalocyanine composition used in Comparative Example 3 was obtained by crystal transformation using no naphthalene and therefore had a crystal form having peaks at Bragg angles (2θ±0.2°) of 6.7°, 7.4° and 27.2° and having no peaks at Bragg angles (2θ±0.2°) of 7.0° and 23.7°, and its crystal form differed from the crystal form of the phthalocyanine composition of the present invention. Therefore, the phthalocyanine composition in Comparative Example 3 gave an electrophotographic photoreceptor that had a low charge potential (V0) and a low sensitivity and which was greatly deteriorated in repeated use. The phthalocyanine composition used in Comparative Example 4 was obtained by using copper phthalocyanine in place of $H_2Pc$. As a result, the phthalocyanine composition in Comparative Example 4 gave an electrophotographic photoreceptor that had a low charge potential (V0) and a low sensitivity and which was extremely deteriorated in repeated use.

EXAMPLE 9

5 Parts by weight of the phthalocyanine composition obtained in Example 1 and 100 parts by weight of tetrahydrofuran were dispersed in a ball mill together with zirconia beads. After 48 hours, 50 parts by weight of Compound (1), 100 parts by weight of a polycarbonate resin (PCZ-200 manufactured by Mitsubishi Gas Chemical Co., Inc.) and 700 parts by weight of tetrahydrofurn were added to the above-obtained dispersion. Further, the resultant mixture was dispersed in a ball mill for 30 minutes, and then the mixture was applied onto an aluminum-deposited polyester with an applicator to form a photosensitive layer having a thickness of approximately 15 µm. The thus-prepared single-layered photoreceptor was evaluated for electrophotographic properties in the same manner as in Example 5. However, the applied voltage alone was changed to +5 kV. As a result, in a first cycle, the charge potential (V0) was +475V and the half-decay exposure (E1/2) was 0.68 lux·second, and in a 1,000th cycle, the charge potential (V0) was +450V and the half-decay exposure (E1/2) was 0.68 lux·second. That is, the photoreceptor exhibited excellent properties.

What is claimed is:

1. A phthalocyanine composition comprising at least a oxytitanium phthalocyanine and a metal-free phthalocyanine and having a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum.

2. The phthalocyanine composition of claim 1, which further contains other phthalocyanine together with the oxytitanium phthalocyanine and the metal-free phthalocyanine.

3. The phthalocyanine composition of claim 2, wherein the content of the other phthalocyanine is 100 parts by weight or less per 100 parts by weight of the metal-free phthalocyanine.

4. The phthalocyanine composition of claim 1, which contains, per 100 parts by weight of the oxytitanium phthalocyanine, 0.1 to 50 parts by weight of the metal-free phthalocyanine alone or 0.1 to 50 parts by weight of a mixture of the metal-free phthalocyanine with other phthalocyanine.

5. The phthalocyanine composition of claim 1, which is for use as a charge-generating material in a photosensitive layer of an electrophotographic photoreceptor.

6. A process for the production of a phthalocyanine composition, which comprises carrying out crystal transformation treatment of an amorphous oxytitanium phthalocyanine and an amorphous metal-free phthalocyanine in a solvent containing water and a naphthalene, to convert them into a composition containing a oxytitanium phthalocyanine and a metal-free phthalocyanine and having a crystal form having peaks at Bragg angles (2θ±0.2°) of 7.0°, 9.0°, 14.1°, 18.0°, 23.7° and 27.3° in CuKα 1.541-angstrom X ray diffraction spectrum and having no peak at a Bragg angle (2θ±0.2°) of 9.5° in the CuKα 1.541-angstrom X ray diffraction spectrum.

7. The process of claim 6, wherein the amorphous oxytitanium phthalocyanine and the amorphous metal-free phthalocyanine are products obtained by rendering oxytitanium phthalocyanine and metal-free phthalocyanine amorphous by an acid pasting method.

8. The process of claim 6, wherein the water is used in an amount of 2 to 100 parts by weight when the total amount of the amorphous oxytitanium phthalocyanine and the amorphous metal-free phthalocyanine is 1 part by weight.

9. The process of claim 6, wherein the naphthalene is used in an amount of 10 to 5,000 parts by weight per 100 parts by weight of the total of the amorphous oxytitanium phthalocyanine and the amorphous metal-free phthalocyanine.

10. The process of claim 6, wherein the crystal transformation treatment is carried out at a temperature of 80 to 100° C.

11. An electrophotographic photoreceptor comprising an electrically conductive substrate and a photosensitive layer formed thereon, the photosensitive layer containing the phthalocyanine composition recited in claim 1, as a charge-generating material.

12. The electrophotographic photoreceptor of claim 11, wherein a single-layered photosensitive layer comprising a charge-generating material, a charge-transporting material and a film-forming binder resin is formed on the electrically conductive substrate.

13. The electrophotographic photoreceptor of claim 12, wherein the charge-transporting material is a hole-transporting material or an electron-transporting material.

14. The electrophotographic photoreceptor of claim 11, wherein a multi-layered photosensitive layer having a charge-generating layer comprising charge-generating material and a film-forming binder resin, and a charge-transporting layer comprising a charge-transporting material and a film-forming binder resin is formed on the electrically conductive substrate.

15. The electrophotographic photoreceptor of claim 14, wherein the charge-transporting material is a hole-transporting material or an electron-transporting material.

* * * * *